(12) United States Patent
Peng et al.

(10) Patent No.: US 8,270,380 B2
(45) Date of Patent: Sep. 18, 2012

(54) METHOD FOR SELECTING AN ACCESS POINT AND APPARATUS FOR USING THE SAME

(75) Inventors: Jui Chu Peng, Hsinchu County (TW); Ya Wen Yang, Hsinchu County (TW); Sung Chien Tang, Hsinchu County (TW)

(73) Assignee: Ralink Technology Corporation, Hsinchu County (TW)

( * ) Notice: Subject to any disclaimer, the term of this patent is extended or adjusted under 35 U.S.C. 154(b) by 449 days.

(21) Appl. No.: 12/570,979

(22) Filed: Sep. 30, 2009

(65) Prior Publication Data

US 2010/0265928 A1   Oct. 21, 2010

(30) Foreign Application Priority Data

Apr. 17, 2009 (TW) .............................. 98112741 A

(51) Int. Cl.
*H04W 4/00* (2009.01)
(52) U.S. Cl. ........................................ 370/338; 370/328
(58) Field of Classification Search .................. None
See application file for complete search history.

(56) References Cited

U.S. PATENT DOCUMENTS

2007/0140163 A1    6/2007  Meier et al.
2009/0271709 A1*   10/2009 Jin et al. ........................ 715/739

FOREIGN PATENT DOCUMENTS

| CN | 1486032 A | 3/2004 |
|---|---|---|
| CN | 1675954 A | 9/2005 |
| CN | 101347005 A | 1/2009 |

OTHER PUBLICATIONS

Office Action for corresponding CN application No. 200910137230.1 dated Jul. 3, 2012 cites CN 101347005A(also US counterpart app. pub. No. 2007140163), CN 1486032A, and CN 1675954A.
English Abstract for Office Action of corresponding CN application No. 200910137230.1 dated Jul. 3, 2012.
English Abstract of cited references CN 101347005A, 1486032A, and 1675954A.

* cited by examiner

Primary Examiner — Derrick Ferris
Assistant Examiner — Kodzovi Acolatse
(74) Attorney, Agent, or Firm — WPAT, P.C.; Anthony King

(57) ABSTRACT

The method generates a candidate list in accordance with the contents of frames transmitted by access points and sequentially performs the handshaking operations with the access points on the candidate list to select a personal identification number (PIN) enabled access point. During the candidate list generating process, this method places Wi-Fi protected setup (WPS) PIN-enabled access points at high priority positions but eliminates non-WPS access points and WPS push button configuration enabled access points.

18 Claims, 4 Drawing Sheets

METHOD FOR SELECTING AN ACCESS POINT AND APPARATUS FOR USING THE SAME

BACKGROUND OF THE INVENTION

1. Field of the Invention

The present invention relates to a communication system, and more particularly, to a method and apparatus for selecting access points.

2. Description of the Related Art

An easy and secure wireless network connection protocol is provided by devices with a Wi-Fi protected setup (WPS). Conventionally, a user needs to create a service set identifier (SSID) manually with wire equivalent privacy (WEP) or Wi-Fi protected access (WPA) to establish a secure wireless connection. However, related background knowledge is needed for the user to complete the conventional setup. During the connection process, the user has to input complicated encrypted passwords to acquire the wireless connection. In contrast, a station or an access point (AP) with the WPS is convenient for users to operate. Moreover, the station or the AP also works with encrypted mechanisms of WPA and WPA2 regarding information security.

At present, devices with the WPS can be enabled using 2 options: personal identification number (PIN) modes and push button configuration (PBC) modes. In the PIN modes, the user has to input a PIN to complete a connection. In the PBC modes, the user has to input push a button, either an actual or a virtual one, on both WPS devices to acquire a connection.

For the use of devices with the WPS, if a specific connection mode is set for an AP, a station intending to connect with the AP has to select the same mode set for connecting so as to establish a connection. Therefore, if a user intends to connect with the WPS APs enabled with PINs, the user has to select a correct AP, i.e., the AP is a WPS AP and is enabled with PINs, so as to complete a handshaking (verification) procedure for acquiring a connection. Therefore, a method and apparatus are needed for selecting an AP so as to speed up the connection process for establishing the connection between a station and a selected AP.

SUMMARY OF THE INVENTION

A method and apparatus for selecting an access point in accordance with the present invention generate a candidate list in accordance with the contents of frames transmitted by access points and sequentially performs the handshaking (verification) operations with the access points on the candidate list to select a PIN-enabled access point. During the candidate list generating process, this method places WPS PIN-enabled access points at high priority positions but eliminates non-WPS access points and WPS push button configuration enabled access points.

One embodiment of the present invention discloses a method for selecting an AP. The method comprises the steps of: deleting a non-WPS AP from a candidate list if the non-WPS AP is listed on the candidate list; deleting a PBC-enabled AP from the candidate list if the PBC-enabled AP is listed on the candidate list; sorting the candidate list after deleting the non-WPS AP or the PBC-enabled AP; and verifying at least one AP listed on the candidate list so as to select an AP.

Another embodiment of the invention discloses a progressive channel scanning apparatus, which comprises a generating unit, a setting unit and a verifying unit. The generating unit is configured to generate a candidate list in accordance with a scanning result. The setting unit is configured to set a start-up AP to be verified and an expiration time in accordance with the candidate list. The verifying unit is configured to verify in order in accordance with the candidate list to select an AP.

BRIEF DESCRIPTION OF THE DRAWINGS

The invention will be described according to the appended drawings in which.

PREFERRED EMBODIMENT OF THE PRESENT INVENTION

Figure 1:
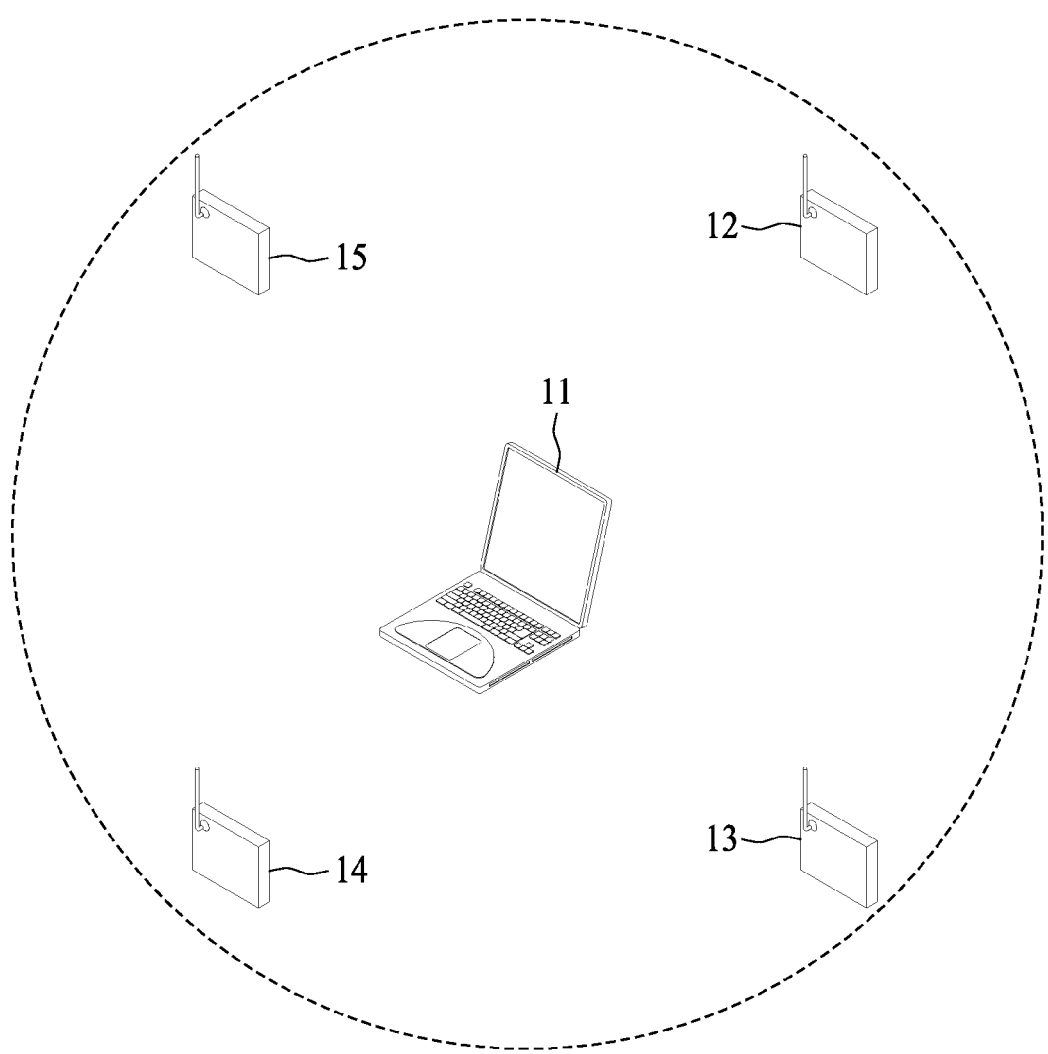
FIG. 1 shows a diagram for a wireless network.

FIG. 1 shows a diagram for a wireless network. The wireless network includes a station 11 and plural APs, AP 12 to AP 15, wherein AP 12 is a non-WPS AP, AP 13 is a WPS PBC-enabled AP, and AP 14 and AP 15 are WPS PIN-enabled APs.

Figure 2:
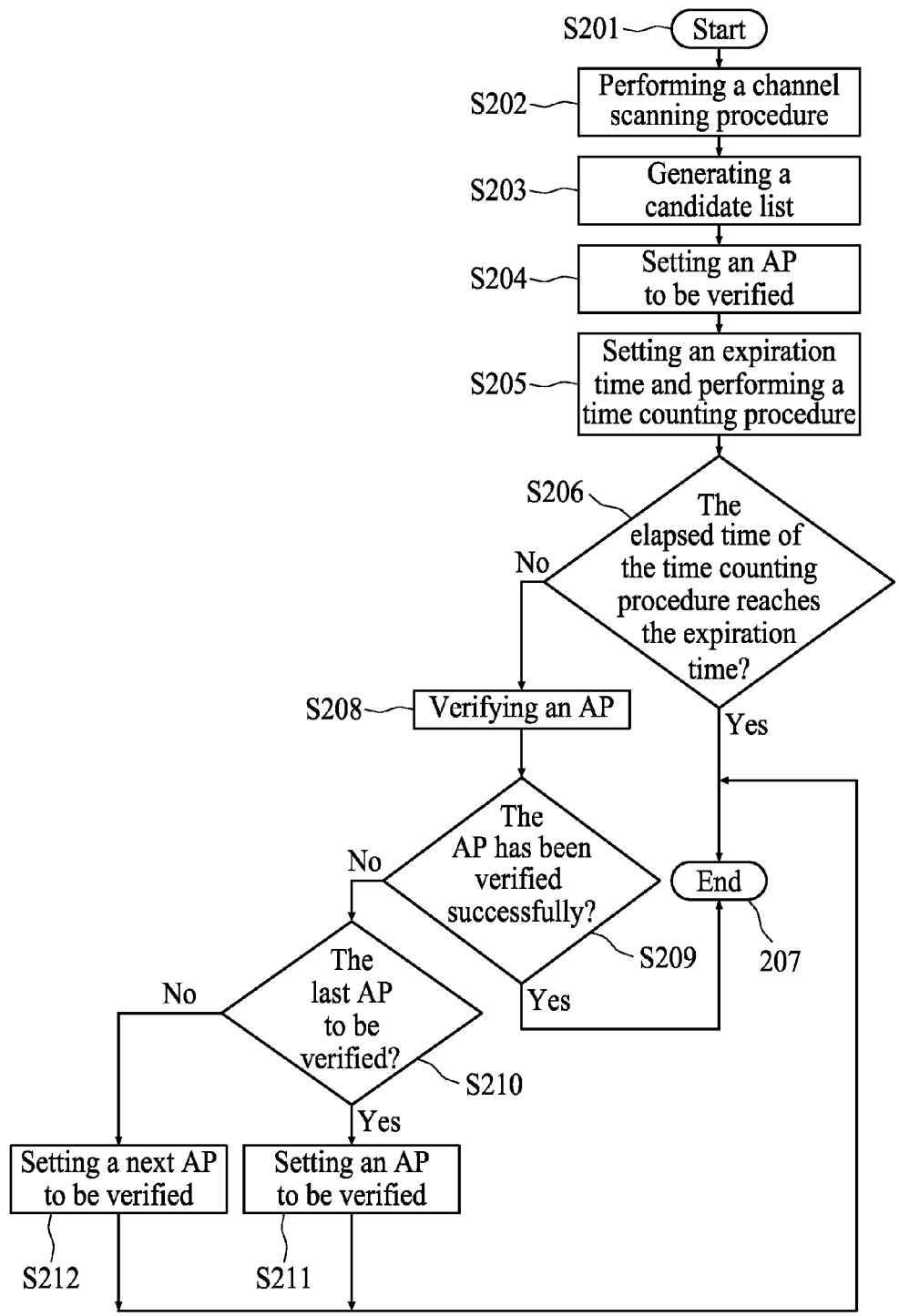
FIG. 2 is a flowchart illustrating the preferred embodiment of the method for selecting an AP.
Figure 3:
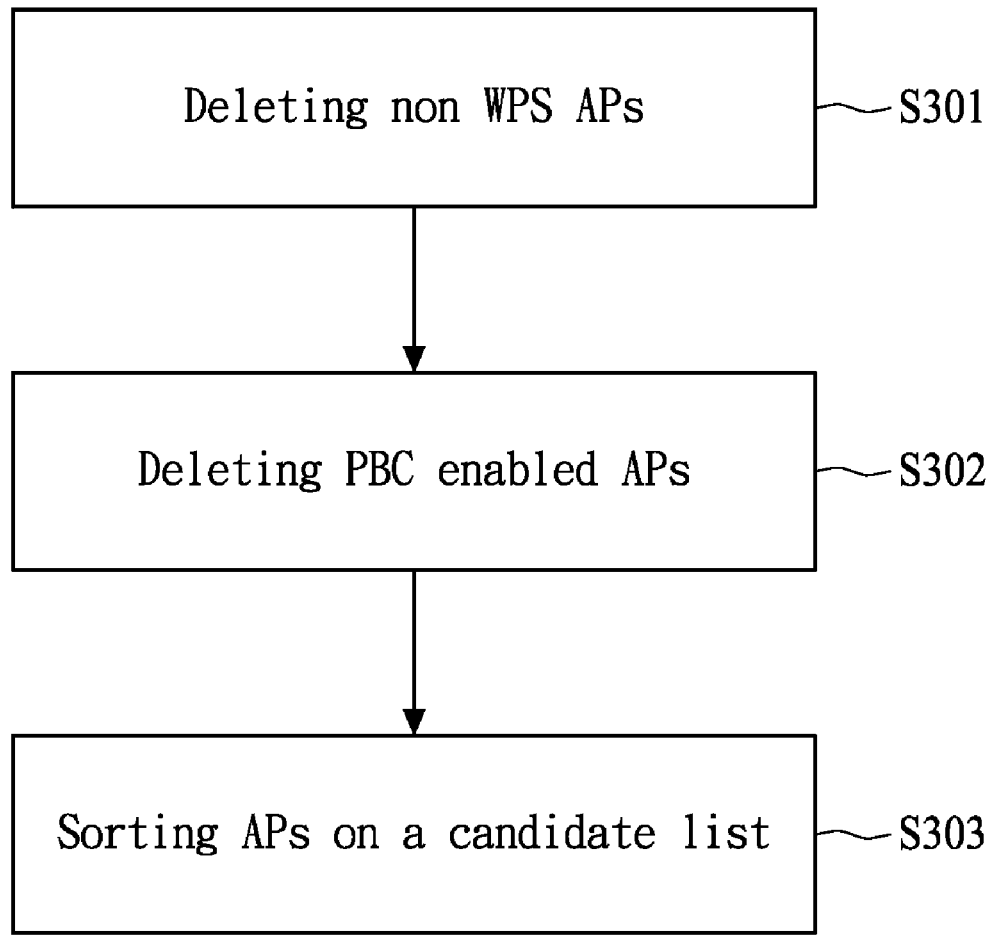
FIG. 3 shows detail steps of step S203.

FIG. 2 is a flowchart illustrating the preferred embodiment of the method for selecting an AP. This embodiment is utilized for the station 11 to select a WPS PIN-enabled AP and to complete a required handshaking (verification) procedure. In step S201, the station 11 starts a procedure for selecting an AP. In step S202, a channel scanning procedure is performed. According to the IEEE 802.11 standard, the scanning phase scans all channels in order to detect the presence of any access points. The two currently available modes for scanning are active scanning and passive scanning. For active scanning, a station selects a channel and sends a broadcast probe request frame and then waits a predetermined period of time. If no "probe response" is transmitted by the AP(s) in response to the probe request within the predetermined period of time, the station selects a next channel and repeats the procedure. For passive scanning, a station simply goes to the channel of interest and passively listens for the periodic beacon frames, if any, sent out by AP(s). If no periodic beacon frame is transmitted by the AP(s) within a predetermined period of time, the station selects a next channel and repeats the passive scanning operation. In this embodiment, after completing the channel scanning procedure, 4 APs (AP 12 to AP 15) are obtained. In step S203, a candidate list is generated in accordance with the scanning result obtained in step S202. FIG. 3 shows the details of step S203. In step S301, non-WPS APs will be deleted. If an AP is a WPS AP, probe response frames or beacon frames forwarded by the AP include WPS information elements (IEs). If probe response frames forwarded by an AP do not include WPS IEs, the AP is deleted from the candidate list. Accordingly, in this step AP 12 is deleted. In step S302, PBC-enabled APs are deleted. The values of device password IDs of WPS IEs are checked to determine whether an AP is a PBC-enabled AP. If the AP is a PBC-enabled AP, the value of the device password ID of the WPS IE of the AP is 0x0004. Accordingly, in this step AP 13 is deleted. In step S303, if an AP is a PIN-enabled AP (for example, AP 14 or AP 15), the AP is placed at a high priority position. If an AP is a PIN-enabled AP, the value of the device password ID of the WPS IE of the AP is 0x0000. However, if WPS IEs of some APs do not necessarily include device password IDs, the APs are placed at low priority positions. In addition, the devices with device password ID values 0x0001, 0x0002, 0x0003, 0x0005 or 0x0006 to 0x00F will also be placed at low priority positions.

Therefore, in this embodiment the candidate list including AP 14 and AP 15 are obtained in step S203. In step S204, an AP to be verified is set in accordance with the candidate list, e.g., AP 14. In step S205, an expiration time is set and a time counting procedure is subsequently performed. The expiration time in this embodiment is about 120 seconds. Step S206 determines whether the elapsed time of the time counting procedure reaches the expiration time. If it does reach the expiration time, the procedure for selecting an AP is ended. If is does not reach the expiration time, AP 14 is verified in step S208. Step S209 determines whether AP 14 has been verified successfully. If the AP has been verified successfully, the procedure for selecting an AP is ended in step S207. If the AP has not been verified successfully, step S210 is then performed.

The following four circumstances mean "failed verification." First, if the station 11 forwards an EAPOL-Start (Extensible Authentication Protocol over LAN) frame to AP 14 and does not receive an EAP-Request/Identity frame (Extensible Authentication Protocol) forwarded by AP 14 within a first period of time, the operation for verifying AP 14 is ended and step S210 is then performed. Second, if the station 11 forwards an EAP-Response/Identity frame to AP 14 and does not receive an EAP-Request (Start) frame forwarded by AP 14 within a second period of time, the operation for verifying AP 14 is ended and step S210 is then performed. Third, if the station 11 forwards an EAP-Response (M1) frame to AP 14 and does not receive an EAP-Request (M2) frame forwarded by AP 14 within a third period of time, the operation for verifying AP 14 is ended and step S210 is then performed. Fourth, if the station 11 receives a Negative Acknowledgement frame forwarded by AP 14, the operation for verifying AP 14 is ended and step S210 is then performed. If one of the above-mentioned circumstances occurs, AP 14 is checked in step S210 to determine whether it is the last AP to be verified on the candidate list. If it is not, a next AP to be verified is determined in step S212. For example, AP 15 is set as a next AP and steps S206 to S212 are then repeated for verifying AP 15. If AP 15 has been verified at this time, a next AP to be verified, i.e., AP 14, is determined and steps S206 to S212 are repeated to select a PIN-enabled AP for the station 11 to connect with the PIN-enabled AP.

In addition to the above-mentioned method for selecting an AP, an apparatus for selecting an AP in accordance with another embodiment is described as follows to enable those skilled in the art to practice the present invention.

Figure 4:
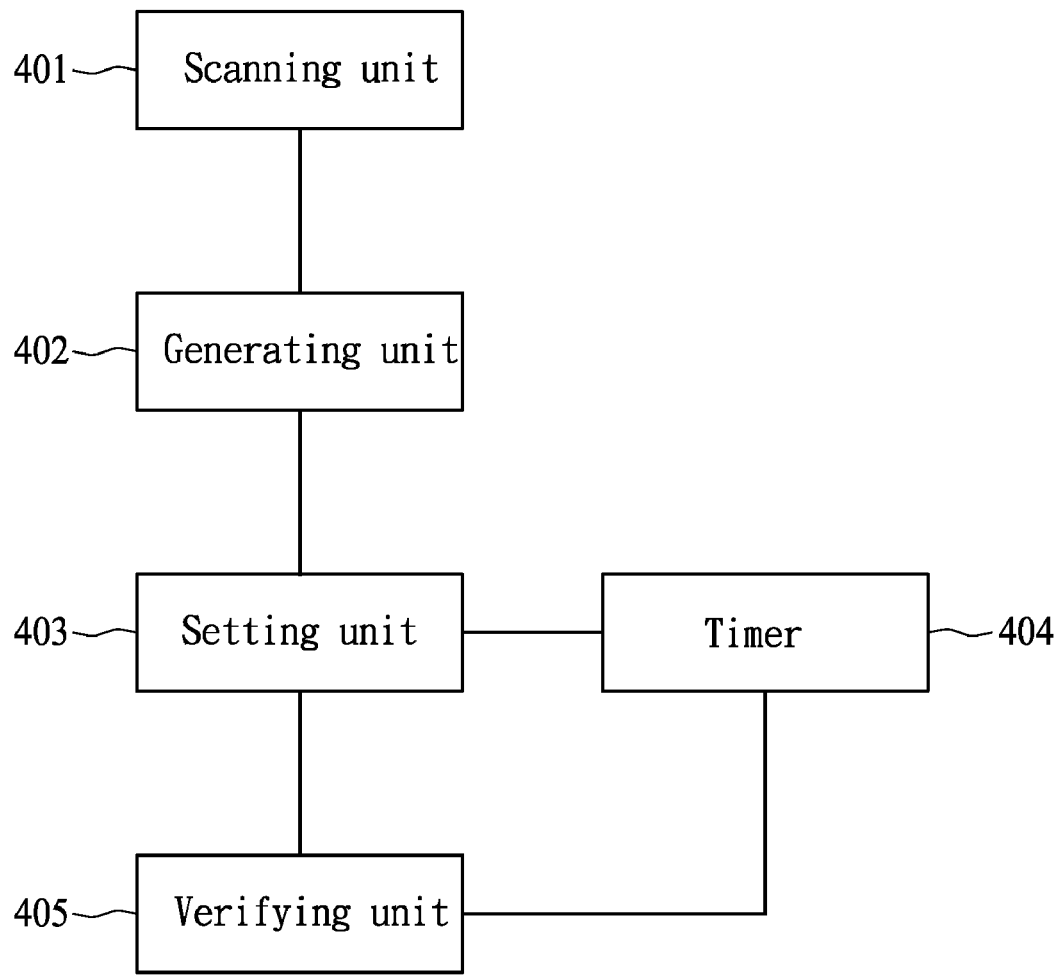
FIG. 4 is a block diagram of the apparatus for selecting an AP in accordance with another embodiment of the present invention.

FIG. 4 is a block diagram of the apparatus for selecting an AP in accordance with another embodiment of the present invention. The apparatus 400 for selecting an AP comprises a scanning unit 401, a generating unit 402, a setting unit 403, a timer 404 and a verifying unit 405. The scanning unit 401 is utilized for scanning channels to obtain a scanning result, wherein an active scanning mode or a passive mode is set for the scanning unit 401. The generating unit 402 is utilized for generating a candidate list in accordance with the scanning result. The setting unit 403 is utilized for setting a start-up AP to be verified and an expiration time in accordance with the candidate list. In accordance with the embodiment of the present invention, the expiration time is about 120 seconds. The timer 404 coupled to the setting unit 403 and the verifying unit 405 is utilized for measuring the time the verifying unit 405 uses for verifying. The verifying unit 405 is utilized for verifying in order in accordance with the candidate list to select a PIN-enabled AP. The apparatus 400 for selecting an AP can be implemented with software, firmware, or hardware and any of a platform with single processor and a platform with multiple processors.

In summary, the method and apparatus for selecting an AP generate a candidate list in accordance with the contents of frames transmitted by APs and sequentially performs the handshaking operation with the APs on the candidate list to select a PIN-enabled AP. During the candidate list generating process, this method places WPS PIN-enabled access points at high priority positions but eliminates non-WPS APs and WPS PBC-enabled APs.

The above-described embodiments of the present invention are intended to be illustrative only. Numerous alternative embodiments may be devised by persons skilled in the art without departing from the scope of the following claims.

What is claimed is:

1. A method for selecting an access point (AP), comprising the steps of:
   deleting a non Wi-Fi protected setup (WPS) AP from a candidate list if the non-WPS AP is listed on the candidate list;
   deleting a push button configuration (PBC) enabled AP from the candidate list if the PBC-enabled AP is listed on the candidate list;
   sorting the candidate list after deleting the non-WPS AP or the PBC-enabled AP; and
   verifying the candidate list so as to select an AP by a wireless station.

2. The method of claim 1, further comprising scanning a plurality of channels and generating the candidate list.

3. The method of claim 2, wherein an active scanning operation is utilized for scanning a plurality of the channels.

4. The method of claim 2, wherein a passive scanning operation is utilized for scanning a plurality of the channels.

5. The method of claim 1, wherein the sorting step comprises the steps of: placing an AP at a high priority position if the AP is a personal identification number (PIN) enabled AP.

6. The method of claim 1, further comprising setting an expiration time.

7. The method of claim 6, wherein the expiration time is 120 seconds.

8. The method of claim 1, further comprising setting a start-up AP to be verified.

9. The method of claim 1, wherein the verifying step comprises the steps of:
   stopping verification of an AP if a station forwards an EAPOL-Start frame to the AP and does not receive an EAP-Request/Identity frame forwarded by the AP within a first period of time;
   stopping verification of the AP if the station forwards an EAP-Response/Identity frame to the AP and does not receive an EAP-Request (Start) frame forwarded by the AP within a second period of time;
   stopping verification of the AP if the station forwards an EAP-Response (M1) frame to the AP and does not receive an EAP-Request (M2) frame forwarded by the AP within a third period of time; and
   stopping verification of the AP if the station receives a Negative Acknowledgement frame forwarded by the AP.

10. The method of claim 1, wherein the AP selected with the verifying step is a PIN-enabled AP.

11. An apparatus for selecting an access point (AP), comprising:
   a generating unit configured to generate a candidate list in accordance with a scanning result;

a setting unit configured to set a start-up AP to be verified and an expiration time in accordance with the candidate list; and a verifying unit configured to verify in order in accordance with the candidate list so as to select an AP;

wherein a non Wi-Fi protected setup (WPS) or a push button configuration (PBC) enabled AP is deleted from the candidate list if the non-WPS AP or the PBC enabled AP is listed on the candidate list.

12. The apparatus of claim 11, further comprising a scanning unit configured to scan a plurality of channels and thus obtain the scanning result.

13. The apparatus of claim 11, further comprising a timer coupled to the setting unit and the verifying unit for counting the time the verifying unit uses for verifying.

14. The apparatus of claim 11, wherein an active scanning mode is set for the scanning unit.

15. The apparatus of claim 11, wherein a passive scanning mode is set for the scanning unit.

16. The apparatus of claim 11, wherein the expiration time is 120 seconds.

17. The apparatus of claim 11, wherein the AP selected with the verifying unit is a personal identification number (PIN) enabled AP.

18. The apparatus of claim 11, which is implemented with software, firmware, hardware, or a platform with single processor or with multiple processors.

* * * * *